United States Patent
Maguire et al.

(10) Patent No.: US 9,985,325 B2
(45) Date of Patent: May 29, 2018

(54) BATTERY PACK FLOW CONTROL METHOD

(71) Applicant: FORD GLOBAL TECHNOLOGIES, LLC, Dearborn, MI (US)

(72) Inventors: Patrick Daniel Maguire, Ann Arbor, MI (US); Kenneth James Miller, Canton, MI (US); Saravanan Paramasivam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 420 days.

(21) Appl. No.: 14/861,545

(22) Filed: Sep. 22, 2015

(65) Prior Publication Data

US 2017/0084968 A1    Mar. 23, 2017

(51) Int. Cl.
*H01M 10/656* (2014.01)
*H01M 10/625* (2014.01)
*H01M 10/6566* (2014.01)
*H01M 10/6563* (2014.01)

(52) U.S. Cl.
CPC ..... *H01M 10/6566* (2015.04); *H01M 10/625* (2015.04); *H01M 10/6563* (2015.04)

(58) Field of Classification Search
None
See application file for complete search history.

(56) References Cited

U.S. PATENT DOCUMENTS

| | | |
|---|---|---|
| 8,251,169 B2 | 8/2012 | Fujiwara |
| 8,329,330 B2 | 12/2012 | Okada |
| 8,435,664 B2 | 5/2013 | Saito et al. |
| 8,820,455 B2 | 9/2014 | Nitawaki et al. |
| 8,994,339 B1 | 3/2015 | Kam |
| 2003/0087148 A1 | 5/2003 | Minamiura |
| 2006/0259817 A1 | 11/2006 | Kawai et al. |
| 2008/0251246 A1 * | 10/2008 | Ohkuma .................. B60K 1/04 165/287 |
| 2009/0260905 A1 | 10/2009 | Shinmura |
| 2012/0164508 A1 | 6/2012 | Houchin-Miller et al. |
| 2013/0004812 A1 | 1/2013 | Nishida |
| 2013/0149583 A1 | 6/2013 | Kurita |
| 2013/0228387 A1 | 9/2013 | Lucas |
| 2013/0268151 A1 | 10/2013 | Bito |

FOREIGN PATENT DOCUMENTS

KR    10-2015-0079211    * 7/2015

* cited by examiner

*Primary Examiner* — Jonathan Crepeau
(74) *Attorney, Agent, or Firm* — Carlson, Gaskey & Olds, P.C.

(57) ABSTRACT

An exemplary method of controlling flow through a battery pack includes, in a first operating condition, moving flow through a first section of an enclosure using a first fan, and moving flow through a second section of the enclosure using a second fan. In a second operating condition, the method moves flow through the second section using the first fan.

17 Claims, 5 Drawing Sheets

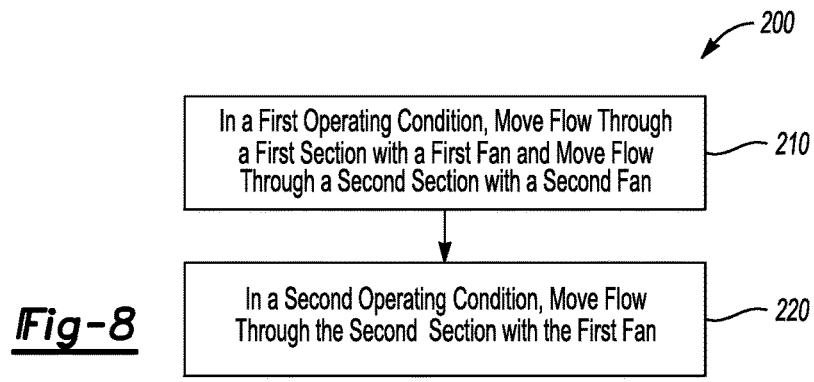
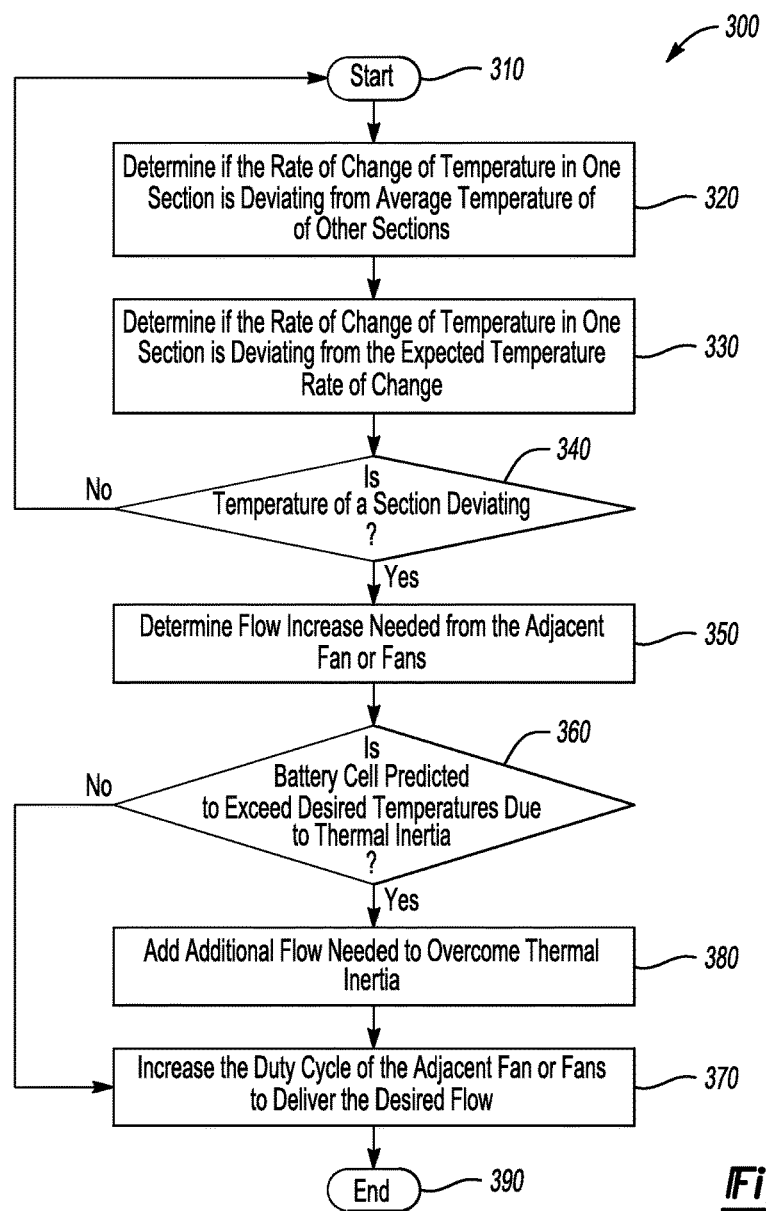

BATTERY PACK FLOW CONTROL METHOD

TECHNICAL FIELD

This disclosure relates generally to a method of controlling flow through a battery pack and, more particularly, to a method that utilizes an array of individual fans to control flow through sections of a battery pack.

BACKGROUND

Electrified vehicles generally differ from conventional motor vehicles because electrified vehicles are selectively driven using one or more electric machines powered by battery cells of a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Referring to FIG. 1, an example prior art battery pack 2 includes battery cells that power the electric machines of an electrified vehicle. A single fan 4 is connected to a duct 6. The fan 4 draws a flow of air through the duct 6 from the battery pack 2. The flow can cool the battery pack 2.

SUMMARY

A method of controlling flow through a battery pack according to an exemplary aspect of the present disclosure includes, among other things, in a first operating condition, moving flow through a first section of an enclosure using a first fan, and moving flow through a second section of the enclosure using a second fan. The method further includes, in a second operating condition, moving flow through the second section using the first fan.

In a further non-limiting embodiment of the foregoing method, the method includes changing from the first operating condition to the second operating condition in response to a change in temperature.

In a further non-limiting embodiment of any of the foregoing methods, the change in temperature includes an actual temperature of the second section varying from an expected temperature of the second section.

In a further non-limiting embodiment of any of the foregoing methods, the change in temperature includes an actual temperature of the second section varying from an average temperature of the battery pack.

In a further non-limiting embodiment of any of the foregoing methods, the change in temperature includes a change in a temperature of a group of battery cells within the second section.

In a further non-limiting embodiment of any of the foregoing methods, the method includes, in the second operating condition, adjusting the first fan to increase flow moved by the first fan.

In a further non-limiting embodiment of any of the foregoing methods, the adjusting is in response to a difference between a temperature of battery cells in the second section and a temperature of battery cells in another area of the enclosure.

In a further non-limiting embodiment of any of the foregoing methods, the adjusting is based on a flow model.

In a further non-limiting embodiment of any of the foregoing methods, the method includes, in the second operating condition, moving flow through the second section and a third section using a third fan, the second section positioned between the first section and the third section within the enclosure.

In a further non-limiting embodiment of any of the foregoing methods, the method includes selectively powering a drivetrain of an electrified vehicle using a first group of battery cells within the first section and second group of battery cells within the second section.

In a further non-limiting embodiment of any of the foregoing methods, the first fan rotates about a first axis to move flow and the second fan rotates about a second axis to move flow. The first axis is aligned with a direction that flow communicates though the first section. The second axis is aligned with a direction that flow communicates through the second section.

A method of controlling flow through a battery pack according to an exemplary aspect of the present disclosure includes, among other things, communicating flow through a first section of an enclosure using a first fan, and communicating flow through a second section of the enclosure using a second fan. The method further includes increasing a speed of the first fan to communicate flow through the second section using the first fan in response to a temperature change in the second section.

In a further non-limiting embodiment of the foregoing method, the temperature change in the second section includes an actual temperature of the second section varying from an expected temperature of the second section.

In a further non-limiting embodiment of any of the foregoing methods, the temperature change in the second section includes an increase in temperature of a group of battery cells in the second section.

In a further non-limiting embodiment of any of the foregoing methods, the temperature change in the second section includes an actual temperature of the second section varying from an average temperature of the battery pack.

In a further non-limiting embodiment of any of the foregoing methods, the first fan rotates about a first axis to move flow and the second fan rotates about a second axis to move flow. The first axis is aligned with a direction that flow communicates though the first section. The second axis is aligned with a direction that flow communicates through the second section.

In a further non-limiting embodiment of any of the foregoing methods, the increasing is based on a flow model.

In a further non-limiting embodiment of any of the foregoing methods, the increasing is further in response to the second fan communicating insufficient flow through the second section.

In a further non-limiting embodiment of any of the foregoing methods, the method includes communicating flow through the second section and a third section using a third fan, the second section positioned between the first section and the third section within the enclosure.

BRIEF DESCRIPTION OF THE FIGURES

The various features and advantages of the disclosed examples will become apparent to those skilled in the art from the detailed description. The figures that accompany the detailed description can be briefly described as follows:

FIG. 8. shows steps of an example method of controlling flow through the battery pack of FIG. 2 or 6, or another battery pack.

FIG. 9. shows steps of an example method of controlling flow through the battery pack of FIG. 2 or 6, or another battery pack.

DETAILED DESCRIPTION

This disclosure relates generally to a method of controlling flow through a battery pack and, more specifically, to a method that controls an array of individual fans within a fan array to influence flow through different sections of the battery pack. The flow is a fluid, such as air, that can cool the battery pack. In another example, the flow can heat the battery pack.

Figure 1:
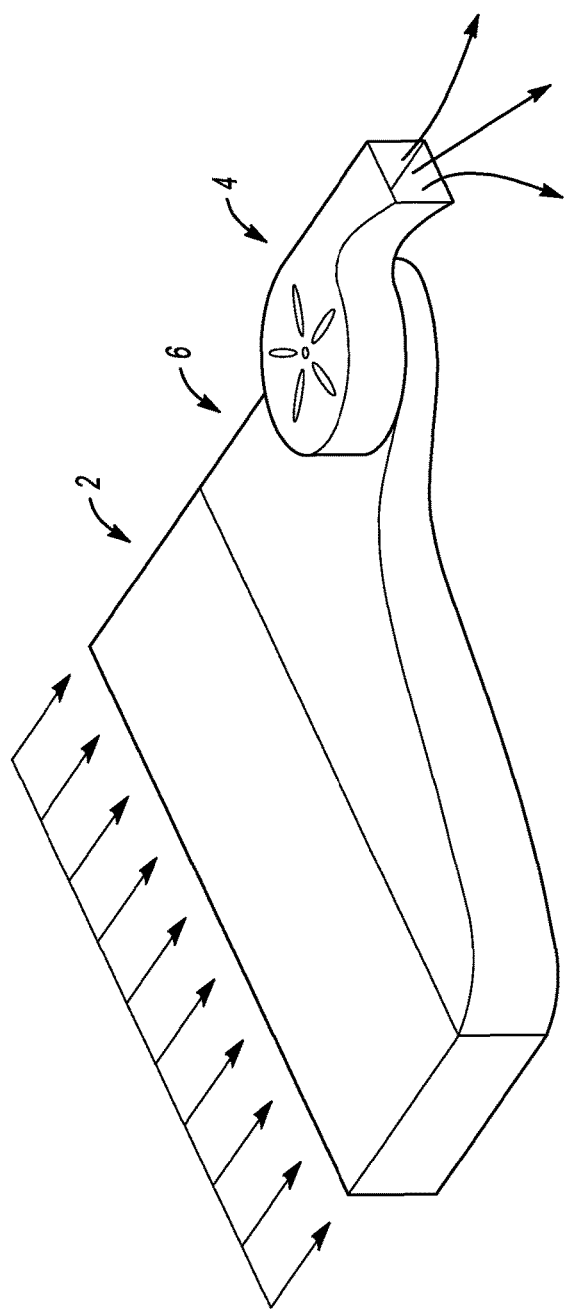
FIG. 1 shows an example prior art battery pack.
Figure 2:
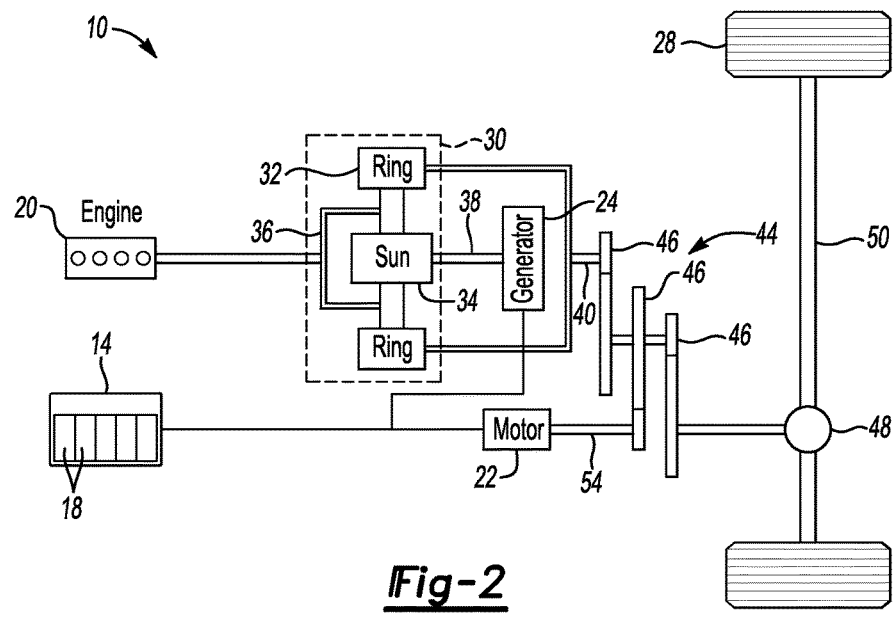
FIG. 2 shows a powertrain of an example electrified vehicle.

Referring to FIG. 2, a powertrain 10 of a hybrid electric vehicle (HEV) includes a battery pack 14 housing groups 18 of battery cells. Each group 18 includes three individual battery cells in this example.

The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 3:
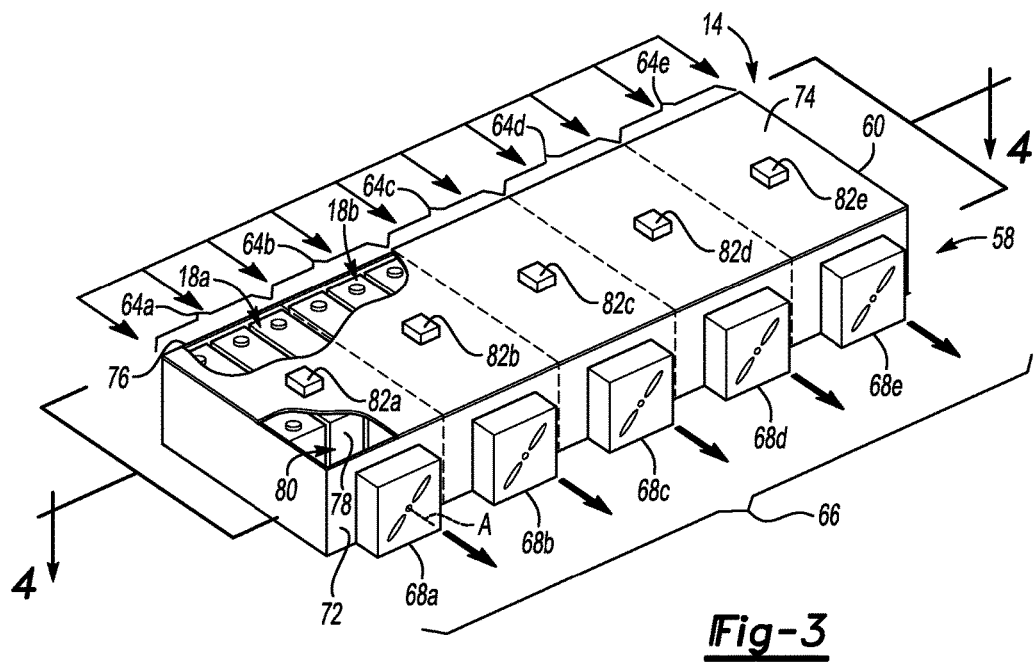
FIG. 3 shows a partially section view of a battery pack flow control system used to control flow through a battery pack used in the powertrain of FIG. 2.

Referring now to FIG. 3 with continuing reference to FIG. 2, an example flow control system 58 for the battery pack 14 interfaces with an enclosure 60 of the battery pack 14. The enclosure 60 is divided into sections 64a-64e or regions, which are represented by broken lines.

The sections 64a-64e each include one of the groups 18a-18e of battery cells. Each section 64a-64e includes three individual battery cells in this example.

In another example, one or more of the sections 64a-64e can include a battery support device, such as a battery electronic control module (BECM), instead of, or in addition to, one of the groups 18a-18e of the battery cells.

The sections 64a-64e are similarly sized. In another example, the sections 64a-64e could have different sizes to accommodate the battery support device, a number of battery cells other than three, or some other component.

The example battery cells are prismatic cells having terminals facing upwardly within the battery pack 14. In another example, the battery cells are cylindrical. Other types of battery cells could be utilized.

The example enclosure 60 includes five sections 64a-64e, but could include some other number. In this example, no dividing walls are used and the sections 64a-64e are not structurally defined separately from each other. The sections 64a-64e could, in another example, be partially separated from each other by a dividing structure, such as a wall, that is inside the enclosure 60. If a dividing structure is used, the dividing structure incorporates an engineered gap, such as an aperture, that permits flow between the sections 64a-64e when such flow is required.

The system 58 includes a fan assembly. In this example, the fan assembly includes a fan array 66 having a plurality of fans 68a-68e. The example fans 68a-68e are mounted directly to a side wall 72 of the enclosure 60. The example fan array 66 includes five fans 68a-68e, but could include some other number of fans.

The fan array 66 moves flow through the battery pack 14. In this example, the flow within the enclosure 60 can move through spaces between the individual battery cells in the groups 18a-18e. Flow can also move through spaces between the groups 18a-18e and between top of the groups and a top 74 of the enclosure 60.

Each of the five sections 64a-64e is associated with one of the five fans 68a-68e. In another example, more than one of the sections 64a-64e is associated with one of the fans 68a-68e. That is, the number of fans 68a-68e need not match the number of sections 64a-64e.

The fans 68a-68e are configured to pull flow through at least a respective one of the sections 64a-64e. Flow moves to the sections 64a-64e through an inlet provided by one or more openings (not shown) in a sidewall 76 of the enclosure 60.

In another example, the fans 68a-68e are configured to push flow through at least a respective one of the sections 64a-64e. In such an example, the openings could provide an outlet from the enclosure.

In yet another example, the fans 68a-68e are reversible and thus configured to selectively push or pull flow through the sections 64a-64e.

The example fans 68a-68e each include a bladed rotor that rotates about an axis A to move flow. The axis A is shown in connection with fan 68a, but it should be understood that each of the remaining fans 68b-68e have a respective axis of rotation. The example fans 68a-68e are aligned such that the axis A is aligned with a direction that flow communicates through the groups 18a-18e in an associated one of the sections 64a-64e. Alternatively, the fans 68a-68e may each include an impeller which discharges air perpendicular to axis A and approximately tangential to the rotation of the impeller about axis A.

The groups 18a-18e terminate at laterally facing sides 78. The fans 68a-68e are spaced from the lateral sides 78, which provides an open area 80 between the fan array 66 and the groups 18a-18e of battery cells. In the open area 80, flow can move between the sections 64a-64e. If physical dividers are used to separate the sections 64a-64e, the physical dividers would not block all flow between the sections 64a-64e in the open area 80. The physical dividers could include apertures, for example, to permit flow between the sections 64a-64e within the open area 80. The open area 80 is within the enclosure 60.

A sensor assembly 82a-82e is associated with each of the sections 64a-64e. The sensor assembly 82a-82e can be used to sense a temperature within a respective one of the sections 64a-64e. The example sensor assemblies 82a-82e can sense a temperature of one or more associated battery cells, or the temperature of a member that is conductively coupled to the associated battery cells, such as a buss bar.

Flow through the sections 64a-64e can alter temperatures of the battery cells and other components in the sections 64a-64e. For example, increasing flow through the section 64a can reduce the temperature of the section 64a and thus reduce the temperatures sensed by the sensor assembly 82a.

Generally, relatively uniform flow across the groups 18a-18e of battery cells can cool or heat the battery cells to a desired level. Under some conditions, variations from approximately uniform flow can be desired.

Figure 4:
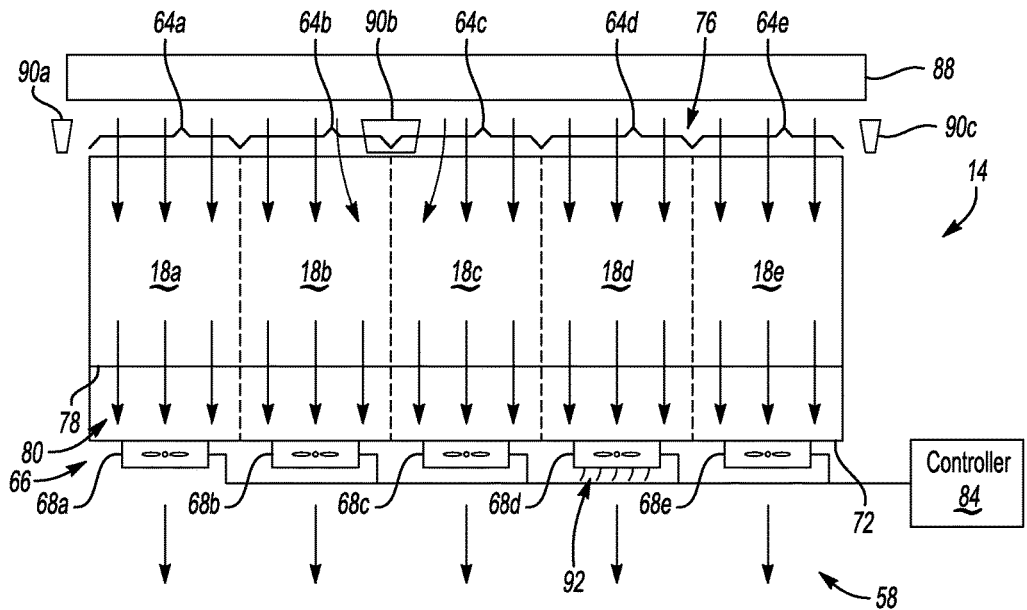
FIG. 4 shows a partially schematic cross-section view of selected portions of FIG. 3 when the battery pack flow control system is in a first operating condition.
Figure 5:
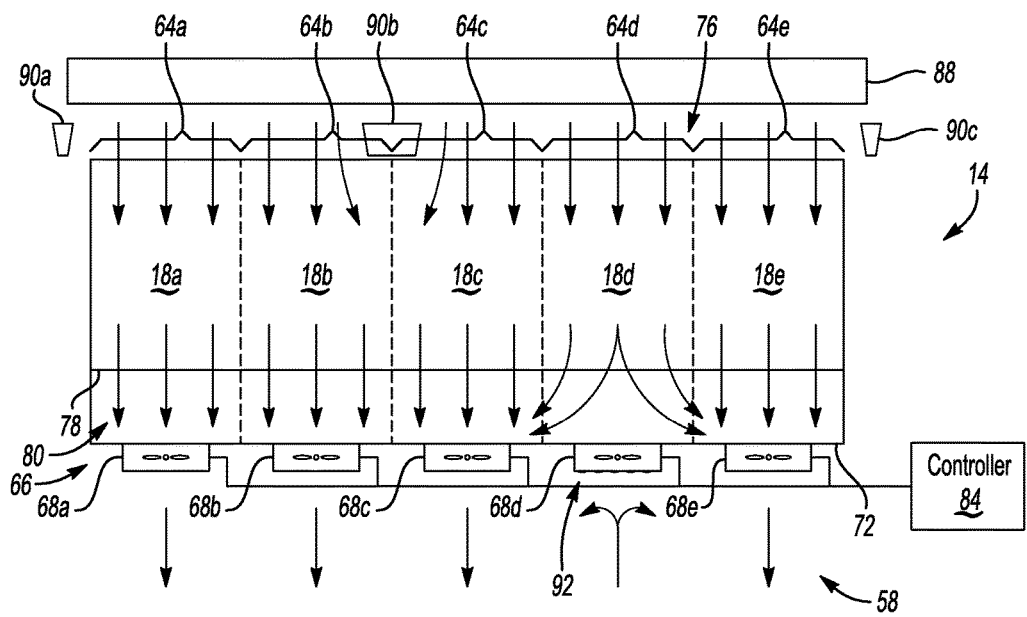
FIG. 5 shows the cross-section of FIG. 4 when the battery pack flow control system in a second operating condition.

Referring to FIGS. 4 and 5 with continuing reference to FIG. 3, each of the fans 68a-68e is operably linked to a controller 84. The fans 68a-68e can be individually adjusted by the controller 84 to selectively increase or decrease flow through one or more of the sections 64a-64e relative to other sections 64a-64e. The groups 18a-18e are represented schematically in FIGS. 4 and 5.

In this example, the controller 84 adjusts the rotational speeds of the individual fans 68a-68e relative to each other to increase or decrease flow through the sections 64a-64e. The controller 84 can receive temperature readings from sensor assemblies 82a-82e and can adjust rotational speeds in response to changes in the temperature readings. For example, if more flow is desired in section 64b than in section 64a, the rotational speed of the fan 68b can be increased relative to the rotational speed of the fan 68a. The effective rotational speeds of the individual fans 68a-68e can be controlled by adjusting the analog power flowing to the fans 68a-68e, controlled by pulse width modulation of the power, or by another means.

Although rotational speeds are adjusted in this example. The controller 84 can, in other examples, make other adjustments to vary flow through one or more of the sections 64a-64e relative to other sections 64a-64e. For example, the controller 84 could actuate an array of vanes to increase or decrease flow.

An operating condition for the system 58 can change to alter flow through the sections 64a-64e. The operating condition can change in response to, for example, a rise in temperatures of the battery cells in one or more of the sections 64a-64e of the battery pack 14 relative to the other battery cells of the battery pack 14. The sensor assembly 82a-82e associated with the sections 64a-64e can sense temperatures and provide temperature information to the controller 84, which then adjusts the fan array 66 to alter flow through the sections 64a-64e.

A variation in temperatures of the sections 64a-64e can be caused, at least in part, by an obstruction that obstructs flow from entering the enclosure 60. For example, the battery pack 14 is positioned behind a rear seat 88 of an electric vehicle. Seatbelt anchors 90a, 90b, and 90c for the rear seat 88 can obstruct flow to the openings 76 of the enclosure 60. In particular, the seatbelt anchor 90b can obstruct flow from entering the section 64b and the section 64c.

The example battery pack 14 extends along across the back of the rear sear 88. The number and size of the battery cells within the battery pack 14 provides little or no room for ducting at the lateral sides of the battery pack 14.

In this example, the battery pack 14 is about 1,000 millimeters wide. Each of the sections 64a-64e has a width of about 200 millimeters. The number of sections 64a-64e and the widths of the sections 64a-64e can be varied from this example. Thickness of example battery cells can be from 12 to 25 millimeters thick for prismatic cells and from 5 to 13 millimeters thick for pouch-style cells. If battery cells having such thickness are used, the sections 18a-18e would likely each include more than three individual battery cells.

Each of the example fans 68a-68e can draw about 20 cfm through the associated section 64a-64e. The fans 64a-64e are similar in size to seat cooling fans in some examples. The number and sizing of the sections 64a and 64e can be a function of a maximum flow required for the battery pack 14 and the volumetric capacity of the fans 68a-68e.

Due to the obstructed flow, temperatures of the group 18b of battery cells in the section 64b and the group 18c of battery cells in the section 64c can rise. To lower the temperature of the battery cells in the sections 64b and 64c, the controller 84 can increase the rotational speed of the fans 68b and 68c relative to the remaining fans 68a, 68d, and 68e. Increasing the rotational speed of the fans 68b and 68c increases flow through the sections 64b and 64c.

The operating condition can change in response to other information instead of, or in addition to, temperatures within the sections 64a-64e. For example, inoperability of one of the fans 68a-68e could trigger the operating condition to change.

As an example, the system 58 of FIG. 4 is operating according to a first operating condition. In the first operating condition, the fan 68a draws flow through the section 64a, the fan 68b draws flow through the section 64b, the fan 68c draws flow through the section 64c, the fan 68d draws flow through the section 64d, and the fan 68e draws flow through the section 64e. The first operating condition, in this example, corresponds to when each of the fans 68a-68e are fully functional and capable of maintaining a desired flow through a respective one of the sections 64a-64e.

In FIG. 5, the system 58 has changed to operate according to a second operating condition. In FIG. 5, the fan 68d is inoperable, or is not capable of operating at a level that can draw sufficient flow through the section 64*d*. In response, the system 58 has changed to the second operating condition.

In the example second operating condition, the controller 84 has increased the rotational speed of the fans 68*c* and 68*e* relative to the other fans 68*a* and 68*b*. Operating the fans 68*c* and 68*e* can compensate for the inability of the fan 68*d* to draw sufficient flow through the section 64*d*. The change in rotational speed of the fans 68*c* and 68*e* represents the change from the first operating condition to the second operating condition in this example.

When the example system 58 operates in the second operating condition, the fan 68*c* draws flow through the section 64*c* and through the neighboring section 64*d*. Also, the fan 68*e* draws flow through the section 64*e* and the neighboring section 64*d*. Increasing the rotational speed of the fans 68*c* and 68*e* increases the flow moved by the fans 68*c* and 68*e*, which helps the fan 68*c* and the fan 68*e* to draw flow from the section 64*d* in addition to the sections 64*c* and 64*e*. The open area 80 provides an engineered opening or gap between adjacent sections 64*a*-64*e* to allow flow to move from one of the sections 64*a*-64*e* to another of the sections 64*a*-64*e*.

In some examples, the fans 68*a*-68*e* can each include a backflow blocker 92, as is represented schematically in connection with fan 68*d*. The backflow blocker 92 can permit flow in one direction through the fan 68, but block backflow through the fan 68*d* in a second, opposite direction.

When the system 58 is in the first operating condition, the backflow blocker 92 is in the first position of FIG. 4 to permit flow to exit the enclosure 60 through the fan 68*d*. When the system 58 is in the second operating condition, the backflow blocker 92 is in the second position of FIG. 5 to block flow from entering the open area 80 through the fan 68*d*.

The direction of flow can cause the backflow blocker 92 to move between the first position and the second position. For example, the backflow blocker 92 can include flaps that open when flow moves from the open area 80 to the fan 68*d*, and pull closed when flow moves from outside the enclosure 60 to the fan 68*d*.

In some examples, the controller 84 actuates and holds the backflow blocker 92 in the first position or the section position. This permits the backflow blocker 92 to be used to change the system 58 between the first and second operating conditions. The backflow blocker 92 can be used instead of, or in addition to, increasing the speed of the fan 68*c* and the fan 68*e* relative to the speed of the fans 68*a* and 68*b*.

In examples where the sections are separated by physical dividers each incorporating one or more apertures to selectively permit flow between the sections 64*a*-64*e* within the open area, the size of the one or more apertures can be adjustable. For example, the controller 84 could actuate fins, or a similar structure to selectively increase or decrease the effective aperture size. Increasing the size of the aperture permits more flow from one of the sections 64*a*-64*e* to an adjacent section through the aperture. Decreasing the size of the aperture permits less flow from one of the sections 64*a*-64*e* to an adjacent section through the aperture.

Figure 6:
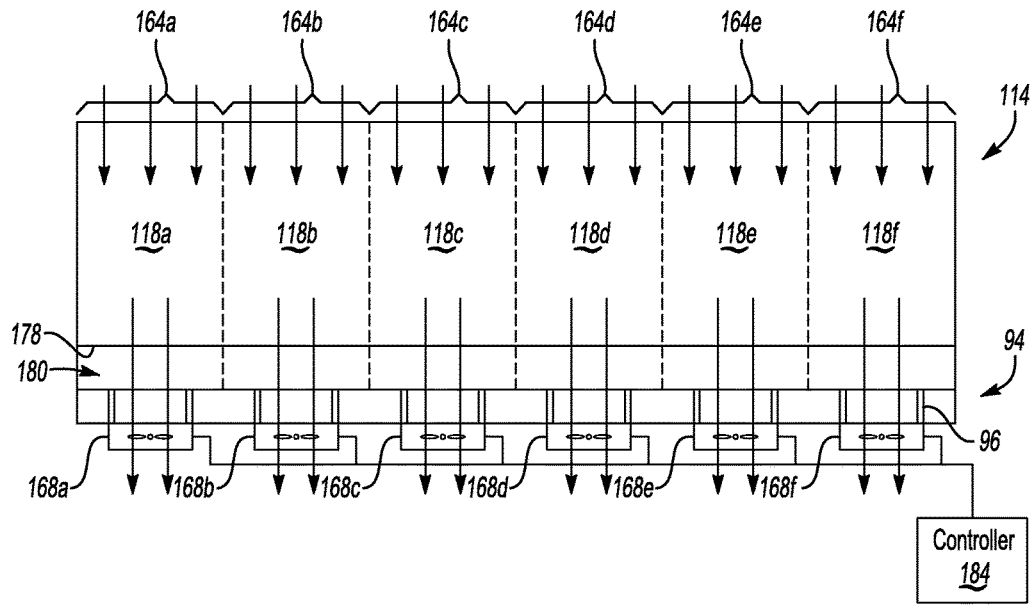
FIG. 6 shows a partially schematic cross-sectional view of another example embodiment of a battery pack and battery pack flow control system in a first operating condition.
Figure 7:
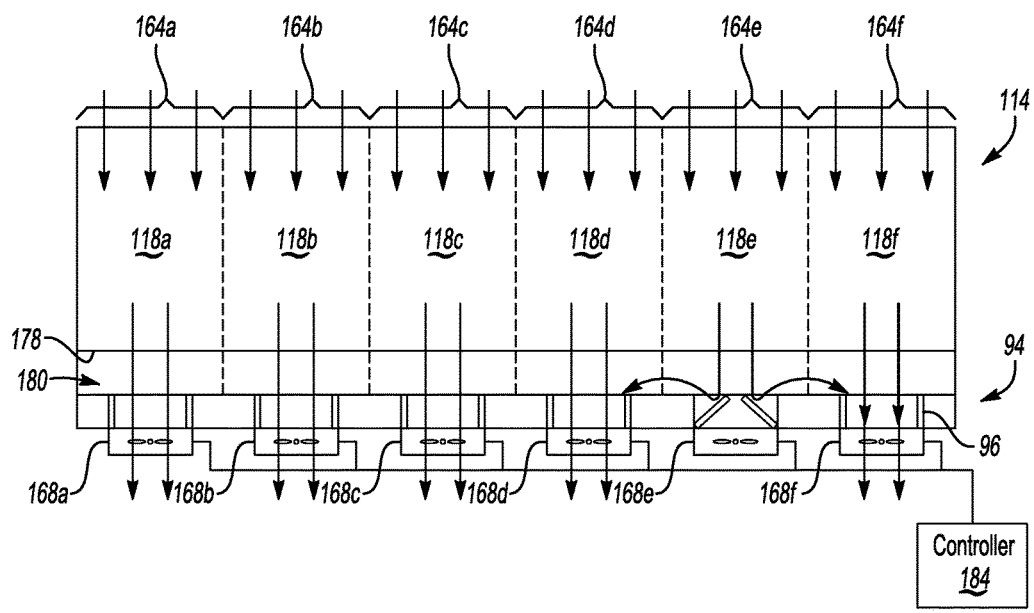
FIG. 7 shows the cross-section of FIG. 6 in a second operating condition.

Referring now to FIGS. 6 and 7, another example system 158 to control flow through a battery pack 114 includes six sections 164*a*-164*f* each housing a respective group 118*a*-118*f* of battery cells. Each of the sections 164*a*-164*f* includes a respective group 118*a*-118*f* of battery cells. The groups 118*a*-118*f* are represented schematically.

The battery cells in the groups 118*a*-118*f* terminate at a laterally facing sides represented by line 178. Each of the sections 164*a*-164*f* is associated with a respective fan 168*a*-168*f*. An open area 180 is positioned between the laterally facing sides and the fans 168*a*-168*f*.

The battery pack 114 includes a louver assembly 94 positioned between the groups 118*a*-118*f* and the fans 168. The louver assembly 94 is operably connected to a controller 184 that is also operably connected to the fans 168*a*-168*f*.

The louver assembly 94 includes a plurality of vanes 96. The controller 184 can selectively actuate individual vanes 96 of the louver assembly 94 to alter flow through the sections 164*a*-164*f* the battery pack 114. A person having skill in this art and the benefit of this disclosure would understand how to actuate selected vanes of the louver assembly 94.

In FIG. 6, the vanes 96 of the louver assembly 94 are aligned with a direction of flow through the battery packs within the sections 164*a*-164*f*. This positioning of the vanes 96 facilitates guiding flow between the sections 164*a*-164*f* and the associated one of the fans 168*a*-168*f*. In FIG. 6, the positioning of the vanes 96 is representative of the example system 158 operating in a first operating condition.

In FIG. 7, some of the vanes 96 have been actuated to guide flow to move between the section 164*e* and the fans 168*d* and 168*f*, rather than between the section 164*e* and the fan 168*e*. The vanes 96 may be actuated to the position of FIG. 7 if the fan 168*e* is incapable moving sufficient flow through the section 164*e*. The positioning of the vanes 96 of FIG. 7 is representative of the example system 158 operating in a second operating condition.

Referring to FIG. 8, an example method 200 controls flow through a battery pack, which could be the battery pack 14 of FIGS. 3-5, the battery pack 114 of FIGS. 6 and 7, or some other battery pack. The steps of the method 300 can be executed on processing circuitry of a controller that is operably connected to temperature sensors, a fan array, and other portions of the battery pack.

The method 200 operates in a first operating condition in a step 210. In the step 210, the method 200 moves flow through a first section of a battery pack enclosure using a first fan, and moves flow through a second section of the battery pack enclosure using a second fan.

The method 200 moves to a step 220 when operating according to a second operating condition. In the step 220, the method 200 moves flow through the second section using the first fan.

One or more factors can cause the method 200 to transition from the first operating condition of the step 210 to the second operating condition of the step 220.

In one example, inoperability of the second fan can cause the method 200 to transition from the step 210 to the step 210.

In another example, the second fan is operable, but the method 200 transitions from the step 210 to the step 220 because the second fan is unable to move sufficient flow through the second section.

In still other examples, the method 200 transitions from the step 210 to the step 220 in response to a change in temperatures. For example, a controller operably connected to temperature sensors associated with the second section can compare the actual temperature of the second section to an expected temperature of the second section. If the actual temperature varies from the expected temperature, the method 200 transitions from the step 210 to the step 220. The variation required to prompt the transition from the step 210 to the step 220 can be a variation that exceeds a threshold amount, say two degrees Celsius. The actual temperature measurement can be an actual temperature measurement of a temperature of battery cells within the second section of the battery pack enclosure.

The expected temperature measurement can be an expected temperature measurement for battery cells within the second section. The expected temperature measurement can instead be an average temperature of the battery pack, such as an average temperature of all the battery cells within the battery pack enclosure.

At the step 220, the method 200 can adjust the first fan to cause the first fan to move flow through the second section. An example adjustment can be increasing a speed of the first fan to increase flow moved by the first fan. Increasing the flow moved by the first fan facilitates the first fan moving flow through both the first and second sections.

The method 200 can, in some examples, adjust the first fan at the step 220 based on a flow model. A database, for example, stored in a memory portion of the controller, can provide the flow model.

The database can include a table containing flow rates associated with different fan speeds, and estimates of flow required to reduce temperatures different amounts. The flow required to reduce temperatures can be impacted by various factors, such as ambient temperatures, humidity, etc. These factors can be stored in the table and influence the flow required to reduce temperatures a desired amount.

If the method 200 is at the step 220 and the temperature of the second section is, for example, two degrees Celsius higher than a desired temperature, the method 200 references the flow model to determine a new target speed for the first fan. When the first fan operates at the new target speed, the first fan moves enough flow through the second section to decrease the temperature two degrees Celsius.

Referring now to FIG. 9, another method 300 of controlling flow through a battery pack starts at a step 310. The method 300 can be used in connection with the battery pack 14 of FIGS. 3-5, the battery pack 114 of FIGS. 6 and 7, or some other battery pack. The steps of the method 300 can be executed on processing circuitry of a controller that is operably connected to temperature sensors, a fan array, and other portions of the battery pack.

After the start at the step 310, the method 300 moves to a step 320. The step 320 substantially compares temperature data for different sections of the battery pack enclosure. The temperature data is battery cell temperature data, for example.

In some examples, the step 320 calculates whether a rate of temperature change in one section of the battery pack enclosure is deviating from an average temperature of the other sections of the battery pack enclosure. In another example, the step 320 calculates whether a rate of temperature change in one section of the battery pack is deviating from an average temperature of all the sections of the battery pack enclosure.

The method then moves to a step 330, which calculates to determine if a rate of temperature change in one section of the battery pack enclosure is deviating from an expected rate of temperature change for that section. An expected temperature rate of change for a section of the battery pack enclosure could be based on several variables including a thermal model of battery heat generation/rejection, flow provided by fans, the root-mean-square of battery cell current, battery cell mass, temperatures, etc. With respect to the root-mean-square of the battery cell current, squaring the current changes the negative current values to positive. Thus, current in and out of the battery adds to the root-mean-square current value. Both charging and discharging can generate thermal energy.

The method 300 then progresses to a step 340, which refers to the calculations from the step 320 and the step 330. If, based on the calculations from the step 320 and the step 330, a temperature of a section of the battery pack enclosure is not deviating, the method 300 returns to the start 310. If, based on the calculations from the step 320 and the step 330, the temperature of a section of the battery pack enclosure is deviating, the method moves to a step 350. Moving to the step 350 from the step 340 can be based on a deviation calculated in the step 320, a deviation calculated in the step 330, or both.

At the step 350, the method 300 calculates a flow increase needed from a fan or fans adjacent to the section of the battery pack experiencing the temperature deviation. The flow increase that is needed can be calculated utilizing a flow model that includes fan flow. The flow increase corresponds to the flow increase needed to adjust thermal energy in the section so that the section is no longer experiencing the temperature deviation.

The method 300 then moves to a step 360 where the method 300 calculates whether at least one area, such as a center, of a battery cell within the section having the deviated temperature is predicted to exceed desired temperatures due to thermal inertia. For example, the temperature sensor may be measuring the outside of the battery cell, but the critical temperature at the center of the battery may be warmer, and may take longer to react to air flow changes.

The prediction at the step 360 can be based on a thermal model of battery cell temperatures that is based on temperature rise rate, temperatures, battery heat generation/dissipation, and thermal characteristics of the battery. Exemplary thermal characteristics can include battery mass, density, size, shape, thermal conductivity, connectivity, emissivity, and other factors that are well known in the field of thermal analysis, etc. The prediction can be a prediction associated with a particular area of a battery cell within the section, such as a center area of the battery cell.

If, at the step 360, the battery cell is not predicted to exceed desired temperatures due to thermal inertia, the method 300 moves to a step 370 where a duty cycle of the adjacent fan or fans is increased to deliver the flow increase calculated in the step 340 to the section experiencing the temperature deviation.

If, at the step 360, the battery cell is predicted to exceed desired temperatures due to thermal inertia, the method 300 moves to a step 380 where an additional flow increase is added to the flow increase calculated in the step 340 is requested from the adjacent fan or fans.

The method 300 then moves from the step 380 to the step 370 where the duty cycle of the adjacent fan or fans is increased to deliver the flow increase calculated in the step 340 and the additional flow increase calculated in the step 380.

When moving from the step 380 to the step 370, the flow in the step 370 includes the flow increase calculated in the step 340 and the additional flow increase calculated in the step 380. When moving from the step 360 to the step 370, the flow in the step 370 includes the flow increase calculated in the step 340.

The method 300 ends at a step 390 after the step 370.

An exemplary system utilizing the method 300 monitors temperatures of sections of a battery pack enclosure and, in particular, battery cell temperatures. The method 300 uses a thermal model and monitored temperatures to detect temperature increases within an individual section. The temperature increases can be due to an inoperable fan, for example.

The method 300 then uses a flow model to determine the quantity of flow increase needed from an adjacent fan or fans to move thermal energy from the section experiencing the temperature increase. This facilitates maintaining a relatively consistent temperature throughout sections of the battery pack enclosure and can prevent temperatures from climbing to undesirable levels due to thermal inertia.

As can be appreciated, outermost sections of the battery pack enclosure can be adjacent a single fan, rather than positioned directly between two fans. For example, the section 64e in FIG. 4 is aligned with fan 68e and adjacent to fan 68d. Section 64d in FIG. 4 is aligned with fan 68d and adjacent to fans 68c and 68e.

If an outermost section is experiencing the temperature deviation, the flow increase of the directly adjacent fan may include doubling the flow moved by the adjacent fan.

Features of some of the disclosed embodiments include a fan array to move flow through groups of battery cells. The fan array is part of a system having a reduced size from prior art systems. The system of the present disclosure can have a reduced length of flow travel, which results in a lower pressure drop and lowering noise vibration and harshness. The system of the present disclosure can reduce ducting requirements versus prior art designs, as well as potential leak points for flow. In addition, the fan array can compensate for the ability of one or more of its fans inability to move sufficient flow.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method of controlling flow through a battery pack, comprising:
   in a first operating condition, moving flow through a first section of an enclosure using a first fan, and moving flow through a second section of the enclosure using a second fan;
   in a second operating condition, moving flow through the second section using the first fan; and
   selectively powering a drivetrain of an electrified vehicle using a first group of battery cells within the first section and second group of battery cells within the second section.

2. The method of claim 1, further comprising changing from the first operating condition to the second operating condition in response to a change in temperature.

3. The method of claim 2, wherein the change in temperature comprises an actual temperature of the second section varying from an expected temperature of the second section.

4. The method of claim 2, wherein the change in temperature comprises an actual temperature of the second section varying from an average temperature of the battery pack.

5. A method of controlling flow through a battery pack, comprising:
   in a first operating condition, moving flow through a first section of an enclosure using a first fan, and moving flow through a second section of the enclosure using a second fan;
   in a second operating condition, moving flow through the second section using the first fan; and
   changing from the first operating condition to the second operating condition in response to a change in temperature, wherein the change in temperature comprises a change in a temperature of a group of battery cells within the second section.

6. The method of claim 2, further comprising, in the second operating condition, adjusting the first fan to increase flow moved by the first fan.

7. The method of claim 6, wherein the adjusting is in response to a difference between a temperature of battery cells in the second section and a temperature of battery cells in another area of the enclosure.

8. The method of claim 6, wherein the adjusting is based on a flow model.

9. The method of claim 6, further comprising, in the second operating condition, moving flow through the second section and a third section using a third fan, the second section positioned between the first section and the third section within the enclosure.

10. The method of claim 1, wherein the first fan rotates about a first axis to move flow and the second fan rotates about a second axis to move flow, the first axis aligned with a direction that flow communicates though the first section, the second axis aligned with a direction that flow communicates through the second section.

11. A method of controlling flow through a battery pack, comprising:
    communicating flow through a first section of an enclosure using a first fan, and communicating flow through a second section of the enclosure using a second fan;
    increasing a speed of the first fan to communicate flow through the second section using the first fan in response to a temperature change in the second section; and
    communicating flow through the second section and a third section using a third fan, the second section positioned between the first section and the third section within the enclosure.

12. The method of claim 11, wherein the temperature change in the second section comprises an actual temperature of the second section varying from an expected temperature of the second section.

13. The method of claim 11, wherein the temperature change in the second section comprises an increase in temperature of a group of battery cells in the second section.

14. The method of claim 11, wherein the temperature change in the second section comprises an actual temperature of the second section varying from an average temperature of the battery pack.

15. The method of claim 11, wherein the first fan rotates about a first axis to move flow and the second fan rotates about a second axis to move flow, the first axis aligned with a direction that flow communicates though the first section, the second axis aligned with a direction that flow communicates through the second section.

16. The method of claim 11, wherein the increasing is based on a flow model.

17. The method of claim 11, wherein the increasing is further in response to the second fan communicating insufficient flow through the second section.

* * * * *